United States Patent [19]

Stotts

[11] 4,163,868
[45] Aug. 7, 1979

[54] WIRE CONNECTOR

[76] Inventor: Hugh D. Stotts, NE. 305 Ash St., Pullman, Wash. 99163

[21] Appl. No.: 912,036

[22] Filed: Jun. 2, 1978

[51] Int. Cl.² .......................... H01R 5/08; B21F 7/00; B21F 15/04

[52] U.S. Cl. .................................... 174/87; 81/9.5 R; 339/98

[58] Field of Search ..................... 174/87, 84 R, 84 S; 81/9.5 R, 9.51; 140/118, 119; 339/98; 29/33

[56] References Cited

U.S. PATENT DOCUMENTS 2,534,881  12/1950  Schroeder ......................... 174/87 X
3,579,172  5/1971   Clark ................................. 174/87
3,956,575  5/1976   Sutherland ........................ 174/87
4,107,453  8/1978   Erixon ............................... 174/87

Primary Examiner—R. N. Envall, Jr.

[57] ABSTRACT

A permanent connector and connection insulator for two wire conductors that automatically strips insulation from the conductors prior to interconnection. A connector body spacedly holding the insulated conductors to be joined rotates in one direction relative an associated cap slidably carrying a stripping bar that by reason of the motion moves along the conductors as they are interconnected by twisting to remove insulation from the interconnected portions of the conductors.

4 Claims, 8 Drawing Figures

WIRE CONNECTOR

BACKGROUND OF INVENTION

RELATED APPLICATIONS

There are no applications related hereto now filed in this or any foreign country.

1. Field of Invention

My invention relates generally to a permanent insulative twist-type connector for two conductor wires and more particularly to such a connector that automatically strips insulation from the conductors during the connecting operation.

2. Description of Prior Art

In the electric arts it is commonly necessary to interconnect the ends of electrical conductors, most commonly in a paired combination. Heretofore various connectors for such purpose have become known. The instant invention provides a new and improved addition to this field of art.

My invention is concerned primarily with the interconnection of two wire type conductors having a cylindrical insulation about their periphery, such as the type of conductor commonly encountered in providing electrical service in various structures. Heretofore the common connectors that have been used for this purpose have required the manual removal of insulation from the ends of the conductors to be connected before their interconnection with the connecting device. What few connectors that have become known that remove insulation have either made provision for the insulation removal in an operation separate and totally unrelated to the connection operation or have provided structures so complex that they have not been practically operative or economical. In the modern day with the cost of labor increasing relative to the values of goods, it becomes increasingly desirable, if not even necessary, to keep the labor factor involved with the interconnection of electrical conductors as low as possible. Though the process of removing insulation from the ends of conductors is not complex or difficult it does require a certain amount of labor and when considered in the light of the great number of such interconnections that commonly are made the value of the labor is significant. My invention seeks to alleviate this problem by providing a connector that automatically removes insulation from the ends of wire conductors to be interconnected during the interconnecting operation.

My particular connector in addition to the automatic insulation removing feature provides the other desired features of wire connectors presently in use. It joins the ends of two wire conductors in a twisted fashion to provide a physically strong, electrically efficient interconnection. The connector insulates and protects the bared interconnected ends of the interconnected conductors and provides a permanent connection that generally cannot be disconnected accidentally or in any normal manual fashion. The device though of a compound nature is simple and positive of operation and easily establishable upon the ends of two wire conductors to be interconnected. The cost of the device is substantially the same as the cost of present day wire connectors that do not provide the insulation stripping feature.

SUMMARY OF INVENTION

My invention provides generally a base interconnected for unidirectional rotation with a cap that defines a chamber slidably carrying an insulation cutter.

The base spacedly positions two wire conductors to be interconnected. The base rotatably carries the cap with a ratchet type structure therebetween to allow rotation in only one direction between the two elements. The cap defines an internal chamber wherein an insulation cutter is carried for slidable motion parallel to the axis of rotation of the body and the cap but irrotatable as to the cap. The insulation cutter has two holes to receive the insulated ends of wire conductors spacedly carried by the base; these holes in their ends nearest the base have sharpened, downwardly extending rims that define an orifice only very slightly larger than the peripheral diameter of the insulated conductors to be interconnected. The insulation cutter chamber defined in the cap is such that after establishment of the insulation cutter therein that cutter may not pass outwardly from the chamber. When wires are inserted in the connector then through the base and into the insulation cutter, and the cap rotated relative to the base, the wires will twist upon each other in the insulation cutter chamber defined in the cap. As the wires do so twist upon each other, the insulation adjacent the cutter rims will be cut and upon further twisting motion this insulation will be moved on the wires toward their end parts so that upon continued rotation of the connector the bare portions of the conductors will be joined by wrapping or twisting about each other.

In creating such a device it is:

A principal object of my invention to provide a twist type connector for two insulated wire conductors that removes the insulation from the end parts of the conductors automatically during the interconnection operation.

A further object of my invention to provide such a connector that is permanent after establishment and one that insulates and protects the bared interconnected portions of the conductors.

A still further object of my invention to provide such a connector that allows simple and easy establishment therein of the insulated end parts of the conductors to be joined thereby and though of a compound nature provides great reliability of operation.

A still further object of my invention to provide such a device that may be produced at substantially the same cost as other present day wire connectors that do not have the automatic insulation removing feature.

A still further object of my invention to provide such a device that is of new and novel design, of rugged and durable nature, of simple and economic manufacture and otherwise well suited to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated as is required.

BRIEF DESCRIPTION OF DRAWINGS

In the accompanying drawings which form a part hereof and wherein like numbers of reference refer to similar parts throughout.

DESCRIPTION OF THE PREFERRED EMBODIMENT

My invention generally provides base 10 rotatably communicating for unidirection rotation with cap 11 which carries bar-like insulation cutter 12 in a chamber defined therein.

Figure 1:
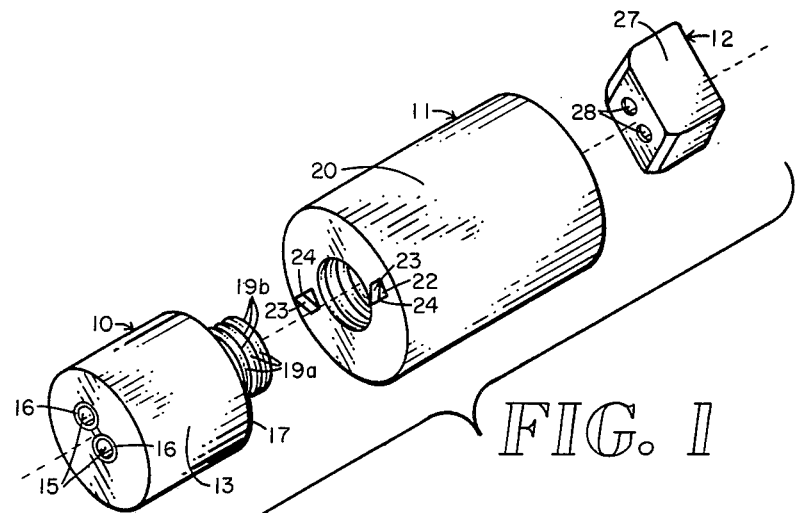
FIG. 1 is an exploded, isometric view of my invention showing its various parts, their configuration and relationship.
Figure 3:
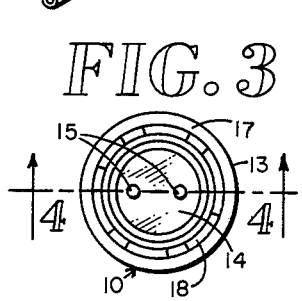
FIG. 3 is an orthographic view of the inward facing end of the base of my invention.
Figure 4:
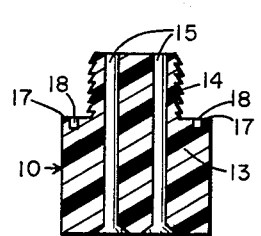
FIG. 4 is an orthographic, cross-sectional view of the base element of FIG. 3 taken on the line 4—4 thereon in the direction indicated by the arrows.

Base 10 is a cylindrical structure, as seen especially in FIGS. 1, 3 and 4, providing larger body 13 at one end and somewhat smaller cap fastener 14 at the other. Spaced cylindrical conductor holes 15 are symmetrically defined in the medial portion of the body and extending therethrough parallel to the axis of the base. The conductor holes are slightly larger in diameter than the insulated conductor to be serviced therein so that that conductor may be easily moved in a sliding fashion along and through the holes. Preferably the outward facing end of the holes, that is the end in the body, is provided with annular bevel 16 to aid insertion of the ends of conductors into the conductor holes.

Body shoulder 17 is provided with circular one-way ratchet structure 18 to cooperate with teeth carried by the cap to allow motion of the cap and base in only one direction relative to each other. The circular ratchet provides plural teeth defined in shoulder 17 by a gradually sloping angle on one side and a precipitous angle on the other to provide the one-way ratchet function desired. Obviously other known mechanical means might limit the motion of the base and cap to one direction relative each other.

The outer cylindrical surface of cap fastener 14 is formed with plural axially spaced annular protuberances 14 each defined by a gently sloping surface 19a and a precipitously sloping surface 19b to cooperate the the similar protuberances on the cap to interconnect the members. This structure when formed of some appropriately deformable material such as a plastic allows the base and cap to be joined with each other by appropriate deformation but yet allows the two structures to rotate relative to each other while maintaining the joinder after it is once established.

Figure 5:
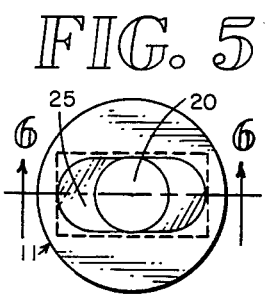
FIG. 5 is a view of the inwardly or base facing end of the cap of my invention.
Figure 7:
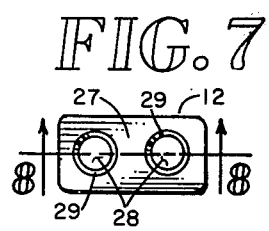
FIG. 7 is an orthographic view of the inwardly facing end of the insulation cutter showing particularly its cutting rims.
Figure 6:
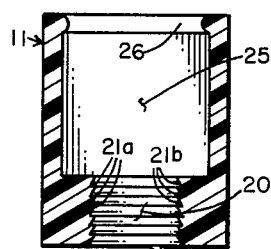
FIG. 6 is an orthographic, cross-sectional view of the cap of FIG. 5 taken on the line 6—6 thereon in the direction indicated by the arrows.
Figure 8:
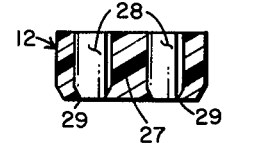
FIG. 8 is an orthographic cross-sectional view of the insulation cutter of FIG. 7 taken on the line 8—8 thereon in the direction indicated by the arrows.

Cap 20 is a cylindrical structure seen especially in FIGS. 1, 5 and 6. It defines in its inward or base facing portion base hole 20 the surface of which forms inwardly protruding annuli 21, each again providing gently sloping surface 21a and precipitously sloping surface 21b configured to interfit and cooperate with annular protuberances 19 of the base to allow rotatable interconnection of the members after establishment by appropriate deformable interconnection.

Plural teeth 22 each defined projecting downwardly toward base 10 from the inward surface of cap 11 are formed with gently sloping surfaces 23 precipitously sloping surface 24 in such position as to cooperatively interfit with circular ratchet 18 of the base to allow the base and cap to rotate relative each other in only one direction when they intercommunicate with each other. Obviously to accomplish this function the fit between the two members must be somewhat loose, the elements of the ratchet somewhat deformable or both. These requirements are admirably met by the common plastic materials and formation processes of modern commerce.

Figure 2:
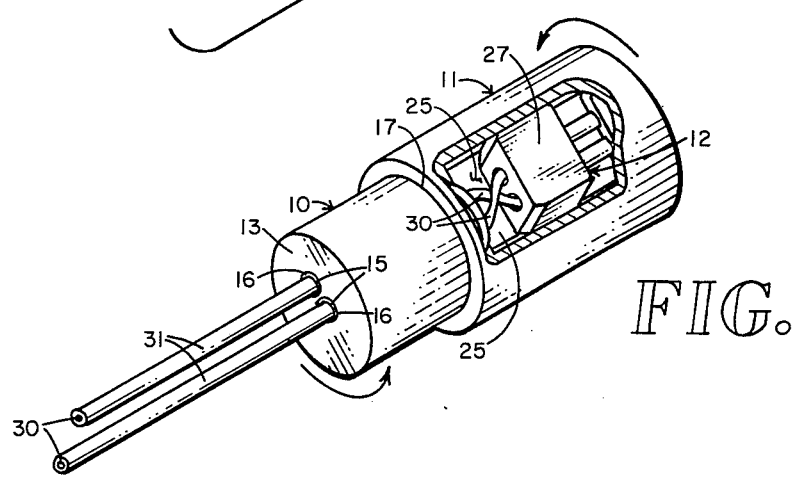
FIG. 2 is an isometric view, partially cut-away, of the assembled connector shown partially interconnecting two insulated wire conductors.

Rectilinear insulation cutter chamber 25 is defined in the outer portion of cap 11, that is the part most distal from base 10. This channel as illustrated in FIGS. 2, 5 and 6 is of a rectangular cross-sectional shape and some substantial length. In its inner part it communicates with base hole 20. Its outer part is somewhat constricted by its insulation cutter retaining rim 26, formed substantially as illustrated in FIGS. 5 and 6, to allow sufficient deformation to permit insertion of an insulation cutter in the channel and maintain it after establishment. The shape and sizing illustrated obviously is not critical and other means well could maintain the insulation cutter within chamber 25.

Preferably both the base and cap of my invention are formed from some reasonably rigid but yet somewhat elastically deformable material to allow assemblage and function as described. Many of the injection molded plastics of modern day commerce are ideally suited to this purpose with these required physical characteristics and also provide appropriate electrically insulative properties for my invention.

Insulation cutter 12 is a rectilinear structure 27 defining two spaced connector holes 28. The two connector holes 28 are sized similarly to and so positioned as to be axially aligned with connector holes 15 defined in base cylinder 10. The cross-sectional configuration of structure 27 is similar to that of insulation cutter chamber 25 defined in cap 11 with dimensioning slightly less than that of the chamber 25 so that the insulation cutter may be slidably moved within the chamber but yet will not readily catch therein to prevent sliding motion. Preferably the corners and edges of insulation cutter slightly rounded so that when the cutter moves within the cutter chamber 25 of the cap no edges or corners will gouge into the cap structure to prevent or hinder motion even through skewed or unsymmetrical forces be applied to the insulation cutter as in the connecting operation. The orifices of each connector hole on the inward or base facing side are provided with annular cutter structures 29 comprising an inwardly extending arcuate rim defining an orifice only slightly larger than the size of an insulated conductor to be serviced by the connector. The thickness of cutter structure 27, that is its dimension in a direction parallel to the axis of the cap cylinder which carries it, is not critical but should be substantially less than the dimension of the insulation cutter chamber 25 in the same direction so that the insulation cutter may move for some substantial distance in the cutter chamber to allow for insulation removal and proper twisting interconnection of conductors.

Insulation cutter 12, or at least its annular cutting structure, must be formed of some rigid durable material to provide an appropriate insulation cutting and stripping function. I prefer to form this element entirely of metal for ease of manufacture, though undoubtedly there are some plastic materials which would serve the purposes and it well could be formed of two different materials, a harder material forming the annular cutter structure and a softer more deformable material forming the remainder of the structure.

Having thusly described the structure of my invention its operation can be understood.

Firstly, a connector is formed according to the foregoing specification and as illustrated especially in the drawing of FIG. 1. The three parts of the connector are assembled firstly by forcing cap fastener 14 of the base 10 into the base hole 20 of cap 11 with appropriate pressure or force exerted along or parallel to the axial lines of the two structures to cause sufficient deformation of protuberances 19, 21 to allow appropriate interconnection of the members. Insulation cutter 12 is then inserted in a similar fashion, with appropriate pressure, through the external orifice of insulation cutter chamber 25 and into that chamber upon required deformation of the rim of the orifice. The connector in this condition then is assembled and ready to interconnect two insulated wire conductors.

As seen especially in FIG. 2, the ordinary wire type conductor provides the conductor wire 30 surrounded by cylindrical insulator 31. The two insulated conductors 30, 31 are inserted in each of conductor holes 15 in base member 10 and slidably moved therethrough until they come into communication with connector holes 28 and insulation cutter 12. The motion of the wires is continued until they extend through the insulation cutter and substantially to the end portion of cap 11. The cutter bar is then manually moved to its innermost position, if it be not in that position, and the cap 11 then rotated in the direction permitted by ratchet 18 and teeth 22 as long as the device may be rotated, that is until insulation cutter 12 comes into contact with cutter retaining rim 26 of the cap 11.

As the cap and base begin to rotate relative each other, insulators 31 of each conductor 30 will be forced against portions of annular cutter structures 29 of each of connector holes 28 defined in insulation cutter 12. As this occurs the sharp surface of this cutter structure will cut through at least a part of insulator 31 of each conductor. As twisting continues the insulated conductors 30, 31 to be interconnected will begin to twist each other and this twisting condition of the conductors as its progresses will force insulation cutter 12 outwardly in cutter chamber 25 to create an elongate pressure (parallel to the wire) upon the insulation of each conductor outward of cutter structures 29. As this pressure becomes great enough the insulation will break and be forced endwise off or partially off the ends of conductor wires 30. As twisting motion of base 10 relative cap 11 continues the bared conductor wires 30 will be twisted about each other to form a traditional twist type connection which joins the conductors both physically and electrically. The twisting motion is continued until the insulation cutter ultimately comes to rest against cutter retaining rim 26 defining the external orifice of cutter chamber 25. In this condition an electrical and physical connection of the conductors has been made and further rotary motion will be prevented since the permitted rotary motion of base 10 relative cap 11 is in one direction only. The connector is permanently placed upon the connected wires and the bared connected portion of the wires is completely contained within cutter chamber 25 defined in cap 11. The dimensioning of the structures should be such as to allow about an inch of travel of insulation cutter 12 within cap 11 so that an adequate twisted joint may be made in the two conductor wires 30 to provide appropriate physical and electrical joinder of the elements. This dimension is not critical, however, and may vary in individual cases according to particular requirements.

It is to be noted from the foregoing description that my connector may be configured to accommodate a particular size of electrical conductor though it is designed particularly for the common conductors used in normal present day structural activities ranging with wire sizes from approximately number 8 wire to number 16 wire.

It is to be further noted that since the connector electrically joins two conductor wires 30 it is not particularly relevant from this consideration at least whether it be conductive or non-conductive. In general, however, because of other factors and as required in various electrical codes the connector must ordinarily be formed from insulative material or at least its external surface portion must be non-conductive. Again, if desired or required, some additional type of cover may be provided over the external orifice of cutter chamber 25 defined in cap 11 without changing or departing from the nature or essence of my invention.

It is further to be noted that my connector might be used to interconnect more than two wires if this operation should be desirable. To do this it is merely necessary to provide an appropriate number of conductor holes in the base and cutter bar elements.

It is particularly to be noted that my connector may be placed on ordinary insulated conductors 30, 31 of commerce without the required use of any extraneous tools and without pre-removal of any insulation from the conductors. Once established in connecting mode the connector cannot readily be removed from the connected conductors by manipulation of either conductors or connector, but rather is reasonably permanently placed. Any disconnection of the device would require substantial physical damage to it.

The foregoing description of my invention is necessarily of a detailed nature so that a specific embodiment of it might be set forth as is required, but it is to be understood that various modifications of detail, rearrangement and multiplication of parts might be resorted to without departing from its spirit, essence or scope.

Having thusly described my invention, what I desire to protect by Letters Patent, and

What I claim is:

1. A permanent wire connector that automatically removes insulation from an insulated wire type conductor during the connecting process, comprising, in combination:

a base having means of unidirectional rotatable communication with a cap and defining at least two spaced conductor holes having axes substantially parallel to and at a spaced distance from the axis of rotation of the base relative to a cap; and a cap carried by the base for unidirectional rotatable motion relative thereto, said cap defining an insulation cutter chamber communicating with the conductor holes defined in the base and irrotatable carrying therein for slidable motion in the insulation cutter chamber an insulation cutter defining at least two spaced conductor holes axially alignable with the conductor holes defined in the base, said insulation cutter conductor holes each having an annular, inwardly extending cutter structure to cut and strip insulation from conductors carried therein upon rotary motion of the cap relative the base.

2. The invention of claim 1 wherein the means of rotatable communication of base with cap comprises:
   a circular cylindrical cap fastener defined by the base with plural annular resiliently deformable protuberances and
   a similar base hole defined in the cap with plural inwardly extending resiliently deformable annuli adapted to interfit with the protuberances of the base to maintain interconnection of the cap and base but allow relative rotation of these interconnected members.

3. The invention of claim 1 wherein the means requiring unidirectional rotary motion of the base relative the cap comprises a ratchet carried by one component and a cooperating interfitting tooth carried by the other.

4. A permanent type wire connector that automatically strips insulation from wire interconnected thereby, comprising, in combination:
   a base having a larger cylindrical body and a smaller circularly cylindrical cap fastener internally defining two axially parallel spaced cylindrical conductor holes, each hole defined through the base parallel to the axis thereof and externally defining a plurality of spaced resiliently deformable protuberances fastening a cap for rotary motion relative to the base;
   a cylindrical cap defining a smaller circularly cylindrical base hole in one end with plural spaced resiliently deformable annuli to fastenably receive and rotatably maintain the cap fastener of the base and in the second end a larger non-circular cylindrical insulation cutter chamber communicating with the base hole; and
   an insulation cutter slidably carried within the insulation cutter chamber for motion parallel to the axis of the cap wherein the cutter chamber is defined, said insulation cutter having paired opposed conductor holes axially alignable with the conductor holes defined in the base, each conductor hole having an annular inwardly extending cutter structure in the base facing end to strip insulation from a conductor passing therethrough upon twisting motion of the base relative the cap; and
   mechanical means limiting the rotary motion of base relative to the cap to one direction.

* * * * *